US011143267B2

(12) United States Patent
Ueki et al.

(10) Patent No.: US 11,143,267 B2
(45) Date of Patent: Oct. 12, 2021

(54) VIBRATION DAMPING DEVICE

(71) Applicant: BRIDGESTONE CORPORATION, Tokyo (JP)

(72) Inventors: Akira Ueki, Tokyo (JP); Yasuyuki Nagashima, Tokyo (JP); Yuki Satake, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 79 days.

(21) Appl. No.: 16/490,746

(22) PCT Filed: Feb. 8, 2018

(86) PCT No.: PCT/JP2018/004388
§ 371 (c)(1),
(2) Date: Sep. 3, 2019

(87) PCT Pub. No.: WO2018/211754
PCT Pub. Date: Nov. 22, 2018

(65) Prior Publication Data
US 2020/0080616 A1    Mar. 12, 2020

(30) Foreign Application Priority Data

May 18, 2017  (JP) .............................. JP2017-098942

(51) Int. Cl.
*B60K 5/12* (2006.01)
*F16F 13/10* (2006.01)

(52) U.S. Cl.
CPC .......... *F16F 13/107* (2013.01); *B60K 5/1208* (2013.01); *F16F 2224/04* (2013.01); *F16F 2230/30* (2013.01)

(58) Field of Classification Search
CPC .......... F16F 13/06; F16F 13/10; F16F 13/107; B60K 5/12; B60K 5/1208
(Continued)

(56) References Cited

U.S. PATENT DOCUMENTS 4,909,490 A * 3/1990 de Fontenay ......... F16F 13/262
267/140.13
5,094,433 A * 3/1992 Dan ...................... F16F 13/105
138/30
(Continued)

FOREIGN PATENT DOCUMENTS

CN    105658990 A    6/2016
CN    106104071 A    11/2016
(Continued)

OTHER PUBLICATIONS

Extended European Search Report dated Aug. 4, 2020, issued by the European Patent Office in application No. 18802069.7.
(Continued)

*Primary Examiner* — Christopher P Schwartz
(74) *Attorney, Agent, or Firm* — Sughrue Mion, PLLC

(57) ABSTRACT

A limiting passage (24) includes: a first communication section (26) that opens to a first liquid chamber; a second communication section (27) that opens to a second liquid chamber; and a main body flow passage (25) that is configured to provide communication between the first and second communication sections. At least one of the first and second communication sections includes a plurality of fine holes (31). A vortex chamber (25b) is disposed at a portion of the main body flow passage, which is connected to at least one of the first and second communication sections, is configured to form a swirling flow of liquid according to a flow velocity of liquid flowing from the other of the first and second communication sections, and causes the liquid of the swirling flow to flow out through the plurality of fine holes. A barrier wall (36a) in which the plurality of fine holes are formed extends in a direction across a vortex axis along a central axis (O2) of the vortex chamber. Among the plurality of fine holes, fine holes located on an inner side in a swirl radial direction across the vortex axis in a top view of the (Continued)

barrier wall have a lower flow resistance than fine holes located on an outer side in the swirl radial direction.

8 Claims, 2 Drawing Sheets

(58) Field of Classification Search
USPC ........ 267/140.13–140.15; 248/550, 562, 565
See application file for complete search history.

(56) References Cited

U.S. PATENT DOCUMENTS

| | | | | |
|---|---|---|---|---|
| 5,443,245 | A * | 8/1995 | Bellamy | ............... F16F 13/106 267/140.13 |
| 2006/0267259 | A1* | 11/2006 | Hatakeyama | ......... F16F 13/106 267/140.13 |
| 2012/0292838 | A1 | 11/2012 | Yamamoto et al. | |
| 2014/0246821 | A1 | 9/2014 | Koga et al. | |
| 2015/0369327 | A1 | 12/2015 | Furumachi et al. | |
| 2016/0053845 | A1* | 2/2016 | Ueki | ..................... F16F 13/107 267/140.13 |
| 2016/0053846 | A1* | 2/2016 | Nagasawa | ............... F16F 13/08 267/140.13 |
| 2016/0131219 | A1 | 5/2016 | Ueki et al. | |
| 2016/0245364 | A1 | 8/2016 | Ueki et al. | |
| 2017/0016508 | A1 | 1/2017 | Ueki | |
| 2018/0073591 | A1 | 3/2018 | Nagasawa et al. | |
| 2019/0145488 | A1* | 5/2019 | Ueki | ....................... F16F 13/10 267/140.13 |
| 2019/0176605 | A1* | 6/2019 | Ueki | ....................... F16F 13/10 |
| 2020/0300331 | A1* | 9/2020 | Nagashima | ........... F16F 13/107 |

FOREIGN PATENT DOCUMENTS

| | | |
|---|---|---|
| CN | 106574682 A | 4/2017 |
| JP | 63-308245 A | 12/1988 |
| JP | 2007-182930 A | 7/2007 |
| JP | 2012-026510 A | 2/2012 |
| JP | 2012-172832 A | 9/2012 |
| JP | 2016-008643 A | 1/2016 |
| WO | 2011/089669 A1 | 7/2011 |
| WO | 2013/140708 A1 | 9/2013 |
| WO | 2014/196284 A1 | 12/2014 |
| WO | 2016/027606 A1 | 2/2016 |
| WO | 2016/147698 A1 | 9/2016 |

OTHER PUBLICATIONS

Search Report dated Aug. 4, 2020, issued by the State Intellectual Property Office of the P.R.C. in application No. 2018800197035.
International Search Report of PCT/JP2018/004388 dated Mar. 20, 2018.

* cited by examiner

VIBRATION DAMPING DEVICE

CROSS REFERENCE TO RELATED APPLICATIONS

This application is a National Stage of International Application No. PCT/JP2018/004388 filed Feb. 8, 2018, claiming priority based on Japanese Patent Application No. 2017-098942 filed May 18, 2017, the contents of which are incorporated herein by reference.

TECHNICAL FIELD

The present invention relates to a vibration damping device that is applied to, for instance, vehicles or industrial machines, and absorbs and damps vibrations of a vibration generator such as an engine.

BACKGROUND ART

As such a type of vibration damping device, a constitution that includes: a first mounting member that is coupled to any one of a vibration generator and a vibration receiver and has a tubular shape, and a second mounting member that is coupled to the other; an elastic body that elastically couples the mounting members; and a partition member that partitions a liquid chamber, which is inside the first mounting member and in which a liquid is sealed, into a main liquid chamber and an auxiliary liquid chamber is known. The partition member is formed with a limiting passage that allows the main liquid chamber and the auxiliary liquid chamber to communicate with each other. In the vibration damping device, when vibrations are input, the mounting members are displaced relative to each other while elastically deforming the elastic body, and a liquid pressure of the main liquid chamber is changed. A liquid circulates through the limiting passage. Thereby, vibrations are absorbed and damped.

Meanwhile, in the vibration damping device, after a large load (a vibration) is input from, for instance, irregularities of a road surface, and the liquid pressure of the main liquid chamber is abruptly raised, when a load is input in a reverse direction by rebounding or the like of the elastic body, the main liquid chamber may undergo abrupt conversion to a negative pressure. Then, due to the abrupt conversion to a negative pressure, cavitation by which numerous air bubbles are generated in the liquid is caused. Furthermore, due to cavitation collapse in which the generated air bubbles collapse, abnormal sound may be generated.

Therefore, like the vibration damping device disclosed in, for instance, Patent Document 1 below, a constitution in which a valve body is provided in the limiting passage, and thereby conversion of the main liquid chamber to a negative pressure is curbed even when a vibration having a large amplitude is input is known.

CITATION LIST

Patent Document

[Patent Document 1]
Japanese Unexamined Patent Application, First Publication No. 2012-172832

SUMMARY OF INVENTION

Technical Problem

However, in the conventional vibration damping device, because the valve body is provided, a structure is complicated, and tuning of the valve body is also required. Thus, there is a problem that manufacturing costs are increased. Because the valve body is provided, the degree of freedom of design is reduced. As a result, there is a possibility of vibration damping characteristics being deteriorated.

The present invention was made in view of these circumstances, and an object thereof is to provide a vibration damping device capable of curbing generation of abnormal sound caused by cavitation collapse with a simple structure without deterioration of vibration damping characteristics.

Solution to Problem

A vibration damping device according to the present invention is a liquid-sealed vibration damping device, and includes: a first mounting member coupled to any one of a vibration generator and a vibration receiver and having a tubular shape, and a second mounting member coupled to the other of the vibration generator and the vibration receiver; an elastic body configured to elastically couple the first and second mounting members; and a partition member configured to partition a liquid chamber, which is inside the first mounting member and in which a liquid is sealed, into a first liquid chamber and a second liquid chamber. A limiting passage that is configured to provide communication between the first liquid chamber and the second liquid chamber is formed in the partition member. The limiting passage includes a first communication section that opens to the first liquid chamber, a second communication section that opens to the second liquid chamber, and a main body flow passage that is configured to provide communication between the first communication section and the second communication section. At least one of the first and second communication sections includes a plurality of fine holes. A vortex chamber is disposed in a portion of the main body flow passage which is connected to at least one of the first and second communication sections, is configured to form a swirling flow of the liquid according to a flow velocity of the liquid from the other of the first and second communication sections, and to cause the liquid with a swirling flow to flow out through the plurality of fine holes. A barrier wall in which the plurality of fine holes are formed extends in a direction across a vortex axis along a central axis of the vortex chamber. Among the plurality of fine holes, fine holes located on the inner side in a swirl radial direction across the vortex axis in a top view of the barrier wall have a lower flow resistance than fine holes located on the outer side in the swirl radial direction.

Effects of Invention

According to the present invention, generation of abnormal sound caused by cavitation collapse can be curbed with a simple structure without deterioration of vibration damping characteristics.

DESCRIPTION OF EMBODIMENTS

Hereinafter, an embodiment of a vibration damping device according to the present invention will be described with reference to FIGS. 1 and 2.

Figure 1:
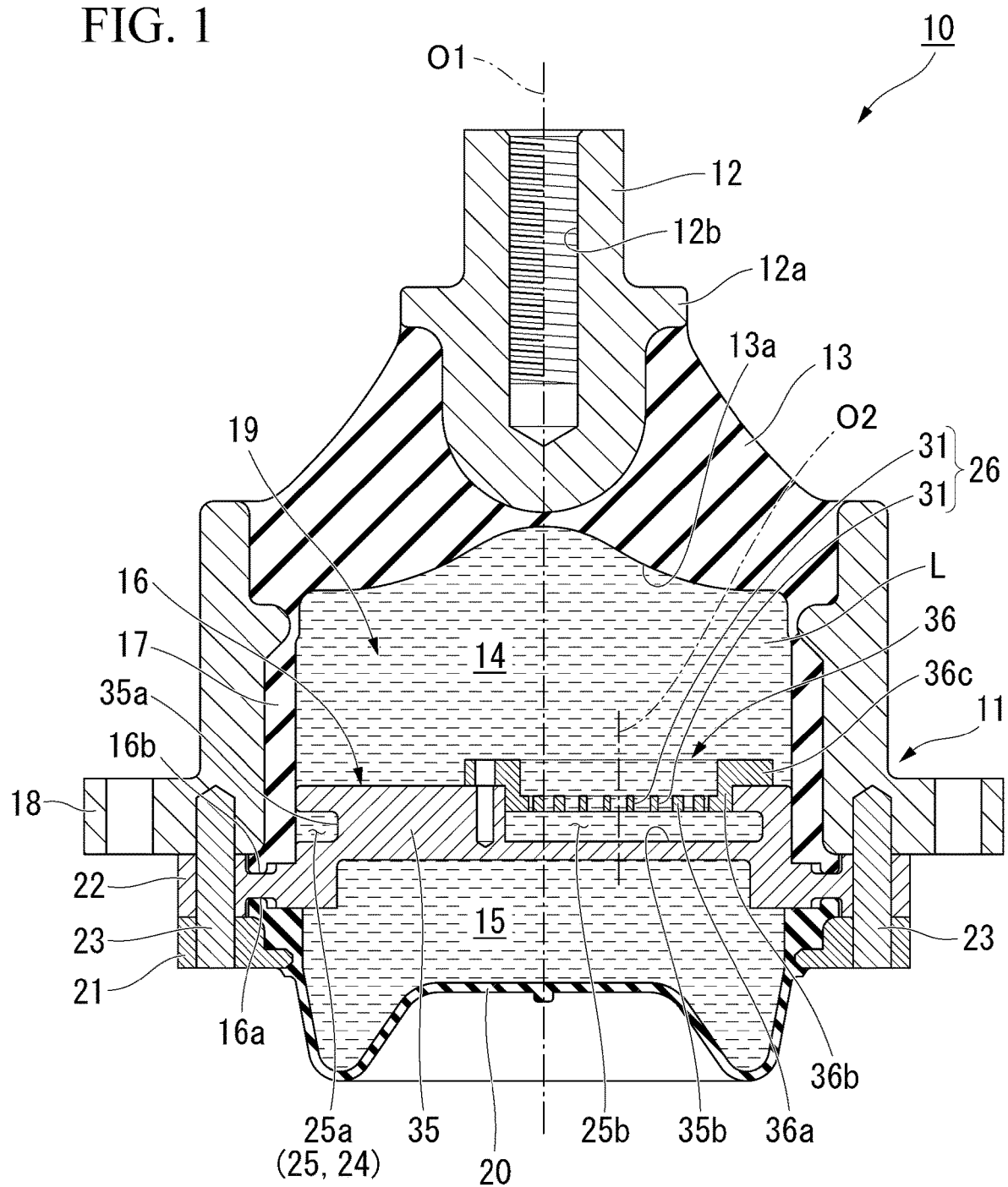
FIG. 1 is a longitudinal sectional view of a vibration damping device according to an embodiment of the present invention.

As shown in FIG. 1, a vibration damping device 10 is a liquid-sealed vibration damping device that includes a first mounting member 11 that is coupled to one of a vibration generator and a vibration receiver and has a tubular shape, a second mounting member 12 that is coupled to the other of the vibration generator and the vibration receiver, an elastic body 13 that mutually elastically couples the first mounting member 11 and the second mounting member 12 to each other, and a partition member 16 that partitions an interior of the first mounting member 11 into a main liquid chamber (a first liquid chamber) 14 and an auxiliary liquid chamber (a second liquid chamber) 15, both of which will be described below.

Hereinafter, a direction parallel to a central axis O1 of the first mounting member 11 is referred to as an axial direction. Further, the vicinity of the second mounting member 12 parallel to the axial direction is referred to as an upper side, and the vicinity of the partition member 16 parallel to the axial direction is referred to as a lower side. Further, in a top view showing the vibration damping device 10 in the axial direction, a direction perpendicular to the central axis O1 is referred to as a radial direction, and a direction around the central axis O1 is referred to as a circumferential direction.

Each of the first mounting member 11, the second mounting member 12, and the elastic body 13 is formed in a circular or annular shape in a top view, and is disposed coaxially with the central axis O1.

When the vibration damping device 10 is mounted on, for instance, a vehicle, the second mounting member 12 is coupled to an engine acting as the vibration generator, and the first mounting member 11 is coupled to a vehicle body acting as the vibration receiver. Thereby, vibrations of the engine are inhibited from being transmitted to the vehicle body.

The second mounting member 12 is a columnar member that extends in the axial direction, and has a lower end that expands downward and is formed in a hemispherical shape, and a flange part 12a above the hemispherical lower end. A screw hole 12b, which extends downward from an upper end face of the second mounting member 12, is drilled in the second mounting member 12, and a bolt (now shown) acting as a mounting tool for an engine is screwed into the screw hole 12b. The second mounting member 12 is disposed in an opening of an upper end of the first mounting member 11 via the elastic body 13.

The elastic body 13 is a rubber body that is vulcanized and bonded to the opening of the upper end of the first mounting member 11 and an outer circumferential surface of a lower portion of the second mounting member 12 and that is interposed therebetween, and blocks the opening of the upper end of the first mounting member 11 from the top. An upper end of the elastic body 13 comes into contact with the flange part 12a of the second mounting member 12. Thereby, the elastic body 13 comes into sufficiently close contact with the second mounting member 12, and is made to better conform to displacement of the second mounting member 12. A rubber membrane 17, which liquid-tightly covers an inner circumferential surface of the first mounting member 11 and an inner circumferential portion of an edge of an opening of a lower end of the first mounting member 11 is integrally formed at a lower end of the elastic body 13. An elastic body formed of, for instance, a synthetic resin in addition to rubber can also be used as the elastic body 13.

The first mounting member 11 is formed in a cylindrical shape in which the lower end thereof has a flange 18, and is coupled to, for instance, the vehicle body acting as the vibration receiver via the flange 18. On the inner side of the first mounting member 11, a portion located under the elastic body 13 becomes a liquid chamber 19. In the present embodiment, the partition member 16 is provided at the lower end of the first mounting member 11, and furthermore a diaphragm 20 is provided below the partition member 16.

The partition member 16 is a member formed of a metal or a resin. The partition member 16 includes a discoid partition plate 35 that extends in a radial direction and has a shape of a circular plate, and an outer circumferential portion 22 that is coupled to an outer circumferential edge of a lower surface of the partition plate 35, protrudes outside the partition plate 35 in a radial direction, and has a shape of an annular plate. An outer circumferential surface of the partition plate 35 extends in both an axial direction and a circumferential direction, and is liquid-tightly in contact with an inner circumferential surface of the rubber membrane 17 having a cylindrical shape. An upper surface of the outer circumferential portion 22 is in contact with the edge of the opening of the lower end of the first mounting member 11.

The diaphragm 20 is formed of an elastic material such as rubber or a soft resin, and is formed in a bottomed cylindrical shape. In a state in which a part of an upper end of the diaphragm 20 is liquid-tightly engaged with an annular mounting groove 16a formed in a lower surface of the outer circumferential portion 22 of the partition member 16, the upper end of the diaphragm 20 is interposed between the lower surface of the outer circumferential portion 22 and a ring-shaped holder 21 located below the partition member 16 in an axial direction. In a state in which a part of a lower end of the rubber membrane 17 is engaged with an annular mounting groove 16b formed in the upper surface of the outer circumferential portion 22, a lower end of the rubber membrane 17 is liquid-tightly in contact with the upper surface of the outer circumferential portion 22 of the partition member 16.

With this constitution, the outer circumferential portion 22 of the partition member 16 and the holder 21 are disposed downward at the edge of the opening of the lower end of the first mounting member 11 in that order, and are integrally fixed by screws 23. Thereby, the diaphragm 20 is mounted on the opening of the lower end of the first mounting member 11 via the partition member 16. In the shown example, the bottom of the diaphragm 20 has a shape in which it is deep at an outer circumferential side thereof and is shallow in the center thereof. However, various well-known conventional shapes can be adopted as the shape of the diaphragm 20, in addition to this shape.

In this way, the diaphragm 20 is mounted on the first mounting member 11 via the partition member 16, and thereby the liquid chamber 19 is formed inside the first mounting member 11 as described above. The liquid chamber 19 is disposed in the first mounting member 11, that is, inside the first mounting member 11 in a top view, and becomes a sealed space that is liquid-tightly sealed by the elastic body 13 and the diaphragm 20. The liquid chamber 19 is encapsulated (filled) with a liquid L.

The liquid chamber 19 is partitioned into the main liquid chamber 14 and the auxiliary liquid chamber 15 with the partition member 16. Since a lower surface 13a of the elastic body 13 is formed as a part of a wall surface of the main liquid chamber 14, the main liquid chamber 14 is a space that is surrounded by the partition member 16 and the rubber membrane 17 that liquid-tightly covers the elastic body 13 and the inner circumferential surface of the first mounting member 11, and an internal volume thereof is changed by deformation of the elastic body 13. The auxiliary liquid chamber 15 is a space surrounded by the diaphragm 20 and the partition member 16, and an internal volume thereof is changed by deformation of the diaphragm 20. The vibration damping device 10 configured in this way is a compression type device that is mounted such that the main liquid chamber 14 is located on the upper side in a vertical direction and the auxiliary liquid chamber 15 is located on the lower side in the vertical direction when used.

Figure 2:
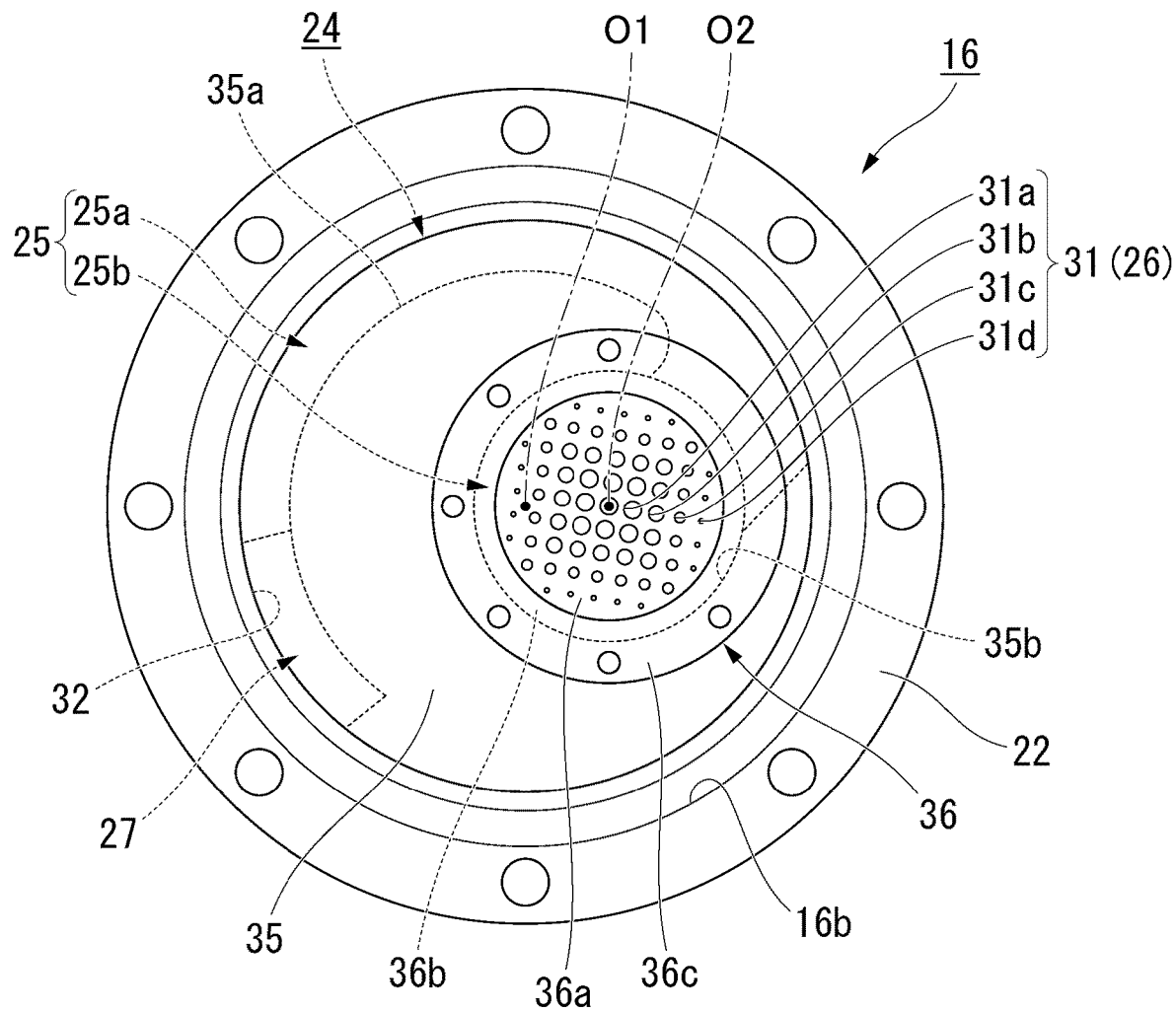
FIG. 2 is a top view of a partition member that constitutes the vibration damping device shown in FIG. 1.

As shown in FIGS. 1 and 2, the partition member 16 is provided with a limiting passage 24 that provides communication between the main liquid chamber 14 and the auxiliary liquid chamber 15. The limiting passage 24 includes a first communication section 26 that opens to the main liquid chamber 14, a second communication section 27 that opens to the auxiliary liquid chamber 15, and a main body flow passage 25 that provides communication between the first communication section 26 and the second communication section 27.

The main body flow passage 25 includes a circumferential flow passage 25a that communicates with the second communication section 27, and a vortex chamber 25b that communicates with the first communication section 26. That is, the vortex chamber 25b is disposed at a portion of the main body flow passage 25 which is connected to the first communication section 26. The circumferential flow passage 25a is defined by a circumferential groove 35a, which is formed in an outer circumferential surface of the partition plate 35 in the partition member 16 to extend in a circumferential direction, and an inner circumferential surface of the rubber membrane 17. The circumferential flow passage 25a extends in the partition plate 35 in a circumferential direction, and a flow passage direction of the circumferential flow passage 25a is equivalent to the circumferential direction. The circumferential flow passage 25a is disposed coaxially with the central axis O1 in a circular arc shape, and extends over nearly half a circumference of the partition plate 35 in the circumferential direction.

A recess 35b, which opens to the main liquid chamber 14 and has a circular shape in a top view, is formed in the partition plate 35. A lid 36, which blocks an opening of the recess 35b, is disposed on the partition plate 35. The vortex chamber 25b having a circular space in a top view is formed by the recess 35b and the lid 36. A central axis O2 of the vortex chamber 25b of the present embodiment is parallel to the central axis O1, and is disposed at a position different from the central axis O1 in a top view. One end of the circumferential flow passage 25a in a circumferential direction opens to an inner surface of the recess 35b, and thus the circumferential flow passage 25a and the vortex chamber 25b communicate with each other. The recess 35b may be formed in a non-circular shape, for instance in an oval shape or the like, in a top view.

The vortex chamber 25b is coupled to the circumferential flow passage 25a to be able to form a swirling flow of a liquid L according to a flow velocity of the liquid L that flows in from the second communication section 27 through the circumferential flow passage 25a. For example, the vortex chamber 25b may be coupled to the circumferential flow passage 25a such that the circumferential flow passage 25a extends in substantially a tangential direction at a coupling portion of the vortex chamber 25b with respect to the circumferential flow passage 25a. However, the coupling manner is not limited to this, the vortex chamber 25b may be coupled to the circumferential flow passage 25a such that a swirling flow can be formed according to an inflow of the liquid L. Since the swirling flow formed in the vortex chamber 25b is formed around the central axis O2, the central axis O2 is referred to below as a vortex axis. That is, the vortex axis extends along the central axis O2. A direction extending along the vortex axis is referred to as a direction of the vortex axis. In a top view, a direction that is perpendicular to (or across) the vortex axis is referred to as a swirl radial direction.

The second communication section 27 includes an opening 32 that opens to the auxiliary liquid chamber 15. The opening 32 is disposed at a portion of the partition plate 35 which forms the other end of the circumferential flow passage 25a in the main body flow passage 25 in a circumferential direction.

The lid 36 is a member that is formed of a metal or a resin. The lid 36 includes a disk-shaped barrier wall 36a that is fitted into the opening of the recess 35b and forms the vortex chamber 25b between the recess 35b and the lid 36, an annular coupler 36b that extends upward from an outer circumferential edge of the barrier wall 36a, and a flange 36c that protrudes outward from an upper end of the coupler 36b in the direction perpendicular to the central axis O2 and has a shape of an annular plate. The flange 36c is screwed to the partition plate 35 to liquid-tightly be in contact with a periphery of the opening of the recess 35b, and thereby the lid 36 is fixed to the partition plate 35.

The barrier wall 36a extends in a direction perpendicular to the vortex axis. The barrier wall 36a may extend in a direction across the vortex axis. The first communication section 26 includes a plurality of fine holes 31 that are formed to pass through the barrier wall 36a in the direction of the vortex axis. Since the plurality of fine holes 31 provide communication between the vortex chamber 25b and the main liquid chamber 14, the vortex chamber 25b enables the liquid L, which flows in from the second communication section 27 through the circumferential flow passage 25a, to flow out to the main liquid chamber 14 through the plurality of fine holes 31.

The plurality of fine holes 31 are disposed in a grid pattern in a top view of the barrier wall 36a. In other words, the plurality of fine holes 31 are disposed at intersections between a plurality of straight lines, which are disposed to be parallel to one another at equal intervals in one direction, and a plurality of other straight lines, which are disposed to be parallel to one another at equal intervals in a direction perpendicular to the one direction, in a top view of the barrier wall 36a.

The plurality of fine holes 31 include a plurality of first fine holes 31a, a plurality of second fine holes 31b, a plurality of third fine holes 31c, and a plurality of fourth fine holes 31d. Among the plurality of first fine holes 31a, one first fine hole 31a is disposed at a position coincident with the central axis O2 in a top view, and the plurality of other first fine holes 31a are disposed to surround the one first fine hole 31a in a square ring shape. The plurality of second fine holes 31b, the plurality of third fine holes 31c, and the plurality of fourth fine holes 31d are also disposed in a square ring shape. The plurality of fine holes 31 are disposed in the order of the first fine holes 31a, the second fine holes 31b, the third fine holes 31c, and the fourth fine holes 31d from the inner side to the outer side in a swirl radial direction. The plurality of fourth fine holes 31d of the present embodiment are disposed parallel to sides of a square in which the plurality of third fine holes 31c are formed, but are not disposed around corners of the square.

Each fine hole 31 is formed in an approximately circular shape in a top view. The inner diameters of the plurality of fine holes 31 gradually increase from the fine holes 31 located on the outer side in the swirl radial direction to the fine holes 31 located on the inner side, and namely become larger in the order of the fourth fine holes 31d, the third fine holes 31c, the second fine holes 31b, and the first fine holes 31a. In other words, the inner diameters of the fine holes 31 located on the inner side in the swirl radial direction among the plurality of fine holes 31 are larger than those of the fine holes 31 located on the outer side in the swirl radial direction. In the present embodiment, for example, the inner diameter of each of the plurality of first fine holes 31a is 1.5 mm, the inner diameter of each of the plurality of second fine holes 31b is 1.3 mm, the inner diameter of each of the plurality of third fine holes 31c is 0.9 mm, and the inner diameter of each of the plurality of fourth fine holes 31d is 0.4 mm. Each fine hole 31 has a constant inner diameter throughout a length of a flow passage thereof. When the inner diameters of the fine holes 31 increase, the flow resistances of the fine holes 31 are reduced, and thus the flow resistances of the plurality of fine holes 31 gradually decrease from the fine holes 31 located on the outer side in the swirl radial direction to the fine holes 31 located on the inner side. In other words, the fine holes 31 located on the inner side in the swirl radial direction among the plurality of fine holes 31 have lower flow resistance than the fine holes 31 located on the outer side in the swirl radial direction.

In the vibration damping device 10 having this constitution, when vibrations are input, the two mounting members 11 and 12 are displaced relative to each other while elastically deforming the elastic body 13. Then, a liquid pressure of at least one of the main liquid chamber 14 and the auxiliary liquid chamber 15 is changed, and the liquid L is made to flow between the main liquid chamber 14 and the auxiliary liquid chamber 15 through the limiting passage 24. In this case, after the liquid flows into the limiting passage 24 through one of the first communication section 26 and the second communication section 27 and flows through an interior of the main body flow passage 25, the liquid flows out of the limiting passage 24 through the other of the first communication section 26 and the second communication section 27.

Here, especially, when the liquid L flows out of the limiting passage 24 to the main liquid chamber 14 through the plurality of fine holes 31, the liquid L flows through the fine holes 31 while being subjected to pressure loss due to the barrier wall 36a in which the fine holes 31 are formed, and thus a flow velocity of the liquid L flowing into the main liquid chamber 14 can be curbed. Moreover, since the liquid L flows through the plurality of fine holes 31 rather than a single fine hole, the liquid L can be caused to flow while diverging into a plurality of flows, and the flow velocity of the liquid L passing through the individual fine holes 31 can be reduced. Thereby, even if a great load (vibration) is input to the vibration damping device 10, a difference in flow velocity between the liquid L that passes through the fine holes 31 to flow into the main liquid chamber 14 and the liquid L in the main liquid chamber 14 can be curbed such that it is small, and generation of a vortex caused by the difference in flow velocity and generation of air bubbles caused by this vortex can be curbed. Further, even if the air bubbles are generated at the limiting passage 24 rather than the main liquid chamber 14, the liquid L is caused to pass through the plurality of fine holes 31. Thereby, the generated air bubbles can be separated in the main liquid chamber 14, merging and growth of the air bubbles are curbed, so that the air bubbles can be easily maintained in a finely dispersed state.

As described above, the generation itself of the air bubbles can be curbed. Further, even if the air bubbles are generated, the air bubbles can be easily maintained in a finely dispersed state. Thus, even if cavitation collapse in which the air bubbles collapse is generated, generated abnormal sound can be curbed such that it is small.

Further, when the liquid L flows into the vortex chamber 25b, which is provided in the portion of the main body flow passage 25 which is connected to the first communication section 26, from the second communication section 27 through the circumferential flow passage 25a due to the input of the vibrations, the liquid L flowing into the vortex chamber 25b flows from the outer side to the inner side in the swirl radial direction while swirling around the vortex axis along the central axis O2 of the vortex chamber 25b. In this case, due to friction between the liquid L and an inner surface of the vortex chamber 25b (i.e., an inner surface of the recess 35b or a lower surface of the barrier wall 36a) or fluid friction of the liquid L, a flow velocity of the swirling flow is reduced from the outer side to the inner side in the swirl radial direction. Since the flow velocity of the swirling flow on the outer side in the swirl radial direction is high, the flow velocity of the liquid L, which flows from the vortex chamber 25b into the fine holes 31 (e.g., the third fine holes 31c and the fourth fine holes 31d) on the outer side in the swirl radial direction among the plurality of fine holes 31 and flows out to the main liquid chamber 14, has a tendency to increase compared to when the liquid L flows into the fine holes 31 (e.g., the first fine holes 31a and the second fine holes 31b) on the inner side in the swirl radial direction. That is, the flow velocity of the liquid L flowing through the plurality of fine holes 31 has a tendency to increase on the outer side relative to the inner side in the swirl radial direction.

Here, in the present embodiment, the fine holes 31 located on the inner side in the swirl radial direction among the plurality of fine holes 31 have lower flow resistance than the fine holes 31 located on the outer side in the swirl radial direction. For this reason, in comparison with the fine holes 31 on the inner side in the swirl radial direction among the plurality of fine holes 31, the liquid L flowing through the fine holes 31 on the outer side in the swirl radial direction is subjected to greater pressure loss, and a flow velocity thereof can be reduced. Therefore, a flow velocity difference generated between the liquid L that passes through the fine holes 31 on the outer side in the swirl radial direction among the plurality of fine holes 31 and flows into the main liquid chamber 14 and the liquid L on the inner side the main liquid chamber 14 can be curbed such that it is small, and generation of a vortex caused by the flow velocity difference and generation of air bubbles caused by the vortex can be curbed.

The flow velocity of the swirling flow inside the vortex chamber 25b gradually decreases from the outer side to the inner side in the swirl radial direction. In the present embodiment, since the flow resistances of the plurality of fine holes 31 gradually decrease from the fine holes 31 located on the outer side in the swirl radial direction to the fine holes 31 located on the inner side, an amount of reduction of the flow velocity of the liquid L that passes through the plurality of fine holes 31 can gradually decrease from the outer side to the inner side in the swirl radial direction, and thus the flow velocity of the liquid that passes through the plurality of fine holes 31 can be equalized regardless of the positions in the swirl radial direction.

(Modification)

A modification of the above embodiment will be described on the basis of FIG. 3. In the description of this modification, components the same as in the above embodiment are given the same reference signs, and description thereof will be omitted.

Figure 3:
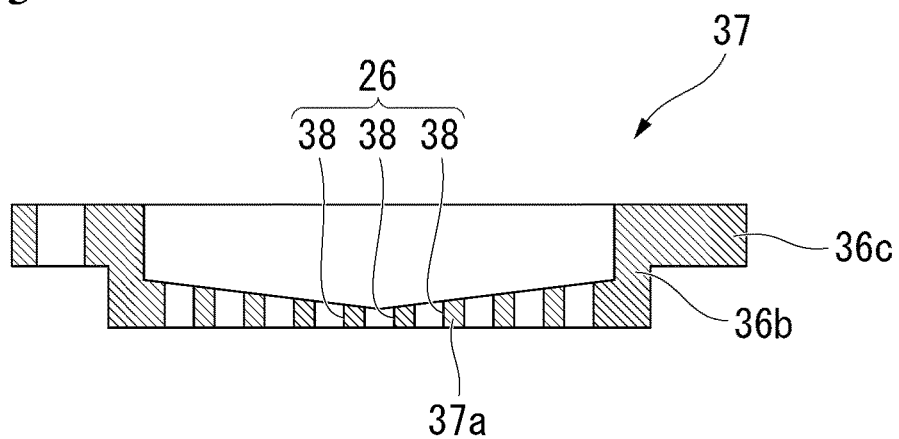
FIG. 3 is a longitudinal sectional view of a lid in a modification of the embodiment of the present invention.

As shown in FIG. 3, this modification uses a lid 37 instead of the lid 36 of the above embodiment. The lid 37 is a member formed of a metal or a resin. The lid 37 includes a barrier wall 37a that extends in a direction perpendicular to a vortex axis and has a shape of a circular plate, a coupler 36b that extends upward from an outer circumferential edge of the barrier wall 37a, and a flange 36c.

A lower surface of the barrier wall 37a extends in the direction perpendicular to the vortex axis, and furthermore a gap between upper and lower surfaces of the barrier wall 37a in the direction of the vortex axis gradually decreases in size from the outer side to the inner side in a swirl radial direction.

For this reason, the thickness of the barrier wall 37a in the direction of the vortex axis gradually decreases from the outer side to the inner side in the swirl radial direction. A first communication section 26 includes a plurality of fine holes 38 formed to pass through the barrier wall 37a in the direction of the vortex axis. The plurality of fine holes 38 are not shown, but are disposed in the same way as the plurality of fine holes 31 of the above embodiment in a top view. Each fine hole 38 is formed in an approximately circular shape in a top view. Inner diameters of the plurality of fine holes 38 are all the same. The inner diameter of each fine hole 38 is a constant over the entire flow passage length.

Since the thickness of the barrier wall 37a in the direction of the vortex axis gradually decreases from the outer side to the inner side in the swirl radial direction, the flow passage lengths of the plurality of fine holes 38 also gradually decrease from the fine holes 38 located on the outer side in the swirl radial direction to the fine holes 38 located on the inner side. In other words, the flow passage lengths of the fine holes 38 located on the inner side in the swirl radial direction are shorter than those of the fine holes 38 located on the outer side in the swirl radial direction. When the flow passage lengths of the fine holes 38 are shortened, flow resistances of the fine holes 38 are reduced, and thus the flow resistances of the plurality of fine holes 38 gradually decrease from the fine holes 38 located on the outer side in the swirl radial direction to the fine holes 38 located on the inner side. In other words, the fine holes 38 located on the inner side in the swirl radial direction have lower flow resistance than the fine holes 38 located on the outer side in the swirl radial direction. The flow passage lengths of the fine holes are lengths of the fine holes which are measured along the central axis.

In this modification, the same effects as in the above embodiment can be exhibited.

The technical scope of the present invention is not limited to the above embodiment and modification, and the present invention may be modified in various ways without departing from the spirit or teaching thereof.

For example, in the above embodiment, the plurality of fine holes 31 include four kinds of fine holes 31 that are the first fine holes 31a, the second fine holes 31b, the third fine holes 31c, and the fourth fine holes 31d, and may include at least two kinds of fine holes. One of the two kinds of fine holes are provided on the inner side in the swirl radial direction, and the other of the two kinds of fine holes are provided on the outer side in the swirl radial direction. One kind of fine holes may have a lower flow resistance than the other kind of fine holes.

The plurality of fine holes 31 of the above embodiment only have different inner diameters, and the plurality of fine holes 38 of the above modification have only different flow passage lengths. However, both the inner diameters and the flow passage lengths of the plurality of fine holes may be different.

Since the flow resistances of the plurality of fine holes are made different, surface treatments of the inner surfaces of the plurality of fine holes 31 may be different, or irregularities or the like may be provided on the inner surfaces of the fine holes 31 located on the outer side in the swirl radial direction.

In the above embodiment and modification, any of the plurality of fine holes 31 and 38 is formed in an approximately circular shape in a top view, but may be formed in a non-circular shape, for instance, in an elliptical shape or in a polygonal shape, in a top view.

The plurality of fine holes 31 and 38 may be formed in a tapered shape in which the diameter gradually decreases from the vicinity of the vortex chamber 25b to the vicinity of the main liquid chamber 14 in an axial direction. In this case, the inner diameters of the fine holes refer to smallest inner diameters of the fine holes.

The plurality of fine holes 31 and 38 may be disposed, for instance, in a multi-annular shape coaxial with the vortex axis in a top view, or may be disposed on a plurality of straight lines that extend from the vortex axis in a radial form in a top view.

The plurality of fine holes 31 and 38 are formed to extend in one direction, but the fine holes may be bent halfway. Even in this case, the flow passage lengths of the fine holes are lengths of the fine holes which are measured along the central axis of the fine holes.

A second communication section 27 may include a plurality of opening or fine holes that open to an auxiliary liquid chamber 15.

In the above embodiment, the vortex chamber 25b is disposed at the portion of the main body flow passage 25 which is connected to the first communication section 26. However, the vortex chamber may be disposed at the portion of the main body flow passage which is connected to the second communication section 27, whereas the second communication section 27 may include a plurality of fine holes without the vortex chamber being disposed at the portion of the main body flow passage which is connected to the first communication section 26. In this case, the vortex chamber disposed at the portion of the main body flow passage 25 which is connected to the second communication section 27 forms a swirling flow of a liquid L according to a flow velocity of the liquid L flowing in from the first communication section 26, and the liquid L flows out to the auxiliary liquid chamber 15 through the plurality of fine holes of the second communication section 27. Further, the vortex chamber may be separately disposed at both the portions of the main body flow passage 25 which are connected to the first communication section 26 and the second communication section 27.

In the above embodiment, the central axis O2 of the vortex chamber 25b is disposed at the position different from the central axis O1 in the top view, but the vortex chamber 25b may be disposed coaxially with the central axis O1.

In the above embodiment, the central axis O2 of the vortex chamber 25b is parallel to the central axis O1, but the vortex chamber 25b may be disposed such that the central axis O2 is nonparallel to the central axis O1.

The partition member 16 may have any shape if the main liquid chamber 14 and the auxiliary liquid chamber 15 can be partitioned by it.

In the above embodiment, the lid 36 includes the barrier wall 36a, the coupler 36b, and the flange 36c, but the lid 36 may be formed in a plate shape that extends in the direction perpendicular to the vortex axis. In this case, the plurality of fine holes are formed in the lid 36, and the portion in which at least the plurality of fine holes are formed in the lid 36 is equivalent to the barrier wall of the present invention.

The recess that opens toward the auxiliary liquid chamber 15 is formed in the partition plate 35, and the lid blocks the opening of the recess from the vicinity of the auxiliary liquid chamber 15. Thereby, the vortex chamber is formed between the lid and the recess, and a plurality of holes providing communication between the vortex chamber and the main liquid chamber 14 may be formed in the partition plate 35 to open to the bottom of the recess. In this case, the portion in which at least the plurality of fine holes are formed in the partition plate 35 is equivalent to the barrier wall of the present invention.

Further, in the above embodiment, the partition member 16 is disposed at the lower end of the first mounting member 11, and the outer circumferential portion 22 of the partition member 16 is brought into contact with the edge of the opening of the lower end of the first mounting member 11. However, for example, the partition member 16 is disposed above the edge of the opening of the lower end of the first mounting member 11 at a sufficient distance, and the diaphragm 20 is disposed at the lower side of the partition member 16, that is, at the lower end of the first mounting member 11. Thereby, the auxiliary liquid chamber 15 may be configured to be formed from the lower surface of the partition member 16 to the bottom surface of the diaphragm 20.

In the above embodiment, the compression type vibration damping device 10 on which a support load acts so that a positive pressure acts on the main liquid chamber 14 has been described. However, the present invention can also be applied to a hanging type vibration damping device which is mounted such that the main liquid chamber 14 is located at the lower side in the vertical direction and the auxiliary liquid chamber 15 is located at the upper side in the vertical direction, and on which a support load acts so that a negative pressure acts on the main liquid chamber 14.

Further, in the above embodiment, the partition member 16 partitions the liquid chamber 19 on the inner side the first mounting member 11 into the main liquid chamber 14 having the elastic body 13 at a part of the wall surface thereof and the auxiliary liquid chamber 15, but the present invention is not limited thereto. For example, the elastic body 13 may be provided instead of providing the diaphragm 20, and a pressure receiving liquid chamber having the elastic body 13 at the part of the wall surface thereof may be provided instead of providing the auxiliary liquid chamber 15. For example, the partition member 16 partitions the liquid chamber 19 that is inside the first mounting member 11 and is encapsulated with the liquid L into the first liquid chamber 14 and the second liquid chamber 15, and at least one of the first liquid chamber 14 and the second liquid chamber 15 can be appropriately changed into another constitution having the elastic body 13 at the part of the wall surface thereof.

The vibration damping device 10 according to the present invention is not limited to an engine mount of a vehicle, and can also applied to anything but the engine mount. For example, the vibration damping device 10 can also applied to a mount of an electric generator mounted in the construction machine, or a mount of a machine installed in a factory or the like.

In addition, without departing from the gist of the present invention, the components in the above embodiment can be appropriately substituted with well-known components, and may be appropriately combined with the modification described above.

According to the present invention, when the vibrations are input, the mounting members are relatively displaced while elastically deforming the elastic body, and the liquid pressure of at least one of the first liquid chamber and the second liquid chamber is changed. Thereby, the liquid is made to flow between the first liquid chamber and the second liquid chamber through the limiting passage. In this case, after the liquid flows into the limiting passage through one of the first and second communication sections and passes through the main body flow passage, the liquid flows out of the limiting passage through the other of the first communication section and the second communication section.

Here, when the liquid flows from the limiting passage into the first liquid chamber or the second liquid chamber through the plurality of fine holes, the liquid flow through each fine hole while being subjected to pressure loss due to the barrier wall in which these fine holes are formed, and thus the flow velocity of the liquid flowing into the first liquid chamber or the second liquid chamber can be curbed. Moreover, since the liquid flows through the plurality of fine holes rather than the single fine hole, the liquid can be caused to flow while diverging into a plurality of flows, and the flow velocity of the liquid passing through the individual fine holes can be reduced. Thereby, even if a great load (vibration) is input to the vibration damping device, a difference in flow velocity between the liquid that passes through the fine holes to flow into the first liquid chamber or the second liquid chamber and the liquid in the first liquid chamber or the second liquid chamber can be curbed such that it is small, and generation of a vortex caused by the difference in flow velocity and generation of air bubbles caused by this vortex can be curbed. Further, even if the air bubbles are generated at the limiting passage rather than the first liquid chamber or the second liquid chamber, the liquid is caused to pass through the plurality of fine holes. Thereby, the generated air bubbles can be separated in the first liquid chamber or the second liquid chamber, mergence and growth of the air bubbles are curbed, so that the air bubbles can be easily maintained in a finely dispersed state.

As described above, the generation itself of the air bubbles can be curbed. For example, even if the air bubbles are generated, the air bubbles can be easily maintained in a finely dispersed state. Thus, even if the cavitation collapse in which the air bubbles collapse is generated, the generated abnormal sound can be curbed such that it is small.

Further, when the liquid flows from the other of the first and second communication sections into the vortex chamber provided at the portion of the main body flow passage which is connected to one of the first and second communication sections due to input of the vibrations, the liquid flowing into the vortex chamber flows from the outer side to the inner side in the swirl radial direction while swirling around the vortex axis along the central axis of the vortex chamber. In this case, due to friction between the liquid and the inner surface of the vortex chamber or fluid friction of a fluid, the flow velocity of the swirling flow is reduced from the outer side to the inner side in the swirl radial direction. Since the flow velocity of the swirling flow on the outer side in the swirl radial direction is high, the flow velocity of the liquid that flows from the vortex chamber into the fine holes on the outer side in the swirl radial direction among the plurality of fine holes and flows out to the first liquid chamber or the second liquid chamber has a tendency to be higher than when the liquid flows into the fine holes on the inner side in the swirl radial direction. That is, the flow velocity of the liquid flowing through the plurality of fine holes has a tendency to be higher on the outer side than on the inner side in the swirl radial direction.

Here, in the present invention, the fine holes located on the inner side in the swirl radial direction among the plurality of fine holes have lower flow resistance than the fine holes located on the outer side in the swirl radial direction. For this reason, in comparison with the fine holes on the inner side in the swirl radial direction among the plurality of fine holes, the liquid flowing through the fine holes on the outer side in the swirl radial direction is caused to undergo greater pressure loss, and the flow velocity thereof can be reduced. Therefore, a difference in flow velocity generated between the liquid that passes through the fine holes on the outer side the swirl radial direction among the plurality of fine holes to flow into the first liquid chamber or the second liquid chamber and the liquid in the first liquid chamber or the second liquid chamber can be curbed such that it is small, and generation of a vortex caused by the difference in flow velocity and generation of air bubbles caused by this vortex can be curbed.

The inner diameters of the fine holes located on the inner side in the swirl radial direction among the plurality of fine holes may be larger than those of the fine holes located on the outer side in the swirl radial direction.

When the inner diameters of the fine holes increase, the flow resistances of the fine holes decrease. For this reason, the inner diameters of the fine holes located on the inner side in the swirl radial direction among the plurality of fine holes are made larger than those of the fine holes located on the outer side in the swirl radial direction, and thereby the fine holes located on the inner side in the swirl radial direction can be made to have lower flow resistance than the fine holes located on the outer side in the swirl radial direction.

The flow passage lengths of the fine holes located on the inner side in the swirl radial direction among the plurality of fine holes may be shorter than those of the fine holes located on the outer side in the swirl radial direction.

When the flow passage lengths of the fine holes are shortened, the flow resistances of the fine holes are reduced. For this reason, the flow passage lengths of the fine holes located on the inner side in the swirl radial direction among the plurality of fine holes are made shorter than those of the fine holes located on the outer side in the swirl radial direction, and thereby the fine holes located on the inner side in the swirl radial direction can be made to have lower flow resistance than the fine holes located on the outer side in the swirl radial direction.

Flow resistances of the plurality of fine holes may gradually decrease from the fine holes located on the outer side to the fine holes located on the inner side in the swirl radial direction.

The flow velocity of the swirling flow in the vortex chamber gradually decreases from the outer side to the inner side in the swirl radial direction. For this reason, the flow resistances of the plurality of fine holes gradually decrease from the fine holes located on the outer side in the swirl radial direction to the fine holes located on the inner side, and thereby an amount of reduction of the flow velocity of the liquid that passes through the plurality of fine holes can gradually decrease from the outer side to the inner side in the swirl radial direction. Therefore, the flow velocity of the liquid that passes through the plurality of fine holes can be equalized regardless of the positions in the swirl radial direction.

INDUSTRIAL APPLICABILITY

Generation of abnormal sound caused by cavitation collapse is curbed with a simple structure without deterioration of vibration damping characteristics.

REFERENCE SIGNS LIST

10 Vibration damping device
11 First mounting member
12 Second mounting member
13 Elastic body
14 Main liquid chamber (first liquid chamber)
15 Auxiliary liquid chamber (second liquid chamber)
16 Partition member
19 Liquid chamber
24 Limiting passage
25 Main body flow passage
25b Vortex chamber
26 First communication section
27 Second communication section
31 Fine hole
36a Barrier wall
L Liquid
O2 Central axis

What is claimed is:
1. A vibration damping device that is a liquid-sealed vibration damping device, comprising:
a first mounting member coupled to either one of a vibration generator and a vibration receiver and having a tubular shape, and a second mounting member coupled to the other of the vibration generator and the vibration receiver;
an elastic body configured to elastically couple the first and second mounting members; and
a partition member configured to partition a liquid chamber, which is inside the first mounting member and in which a liquid is sealed, into a first liquid chamber and a second liquid chamber,
wherein a limiting passage that is configured to provide communication between the first liquid chamber and the second liquid chamber is formed in the partition member,
the limiting passage includes a first communication section that opens to the first liquid chamber, a second communication section that opens to the second liquid chamber, and a main body flow passage that is configured to provide communication between the first communication section and the second communication section,
at least one of the first and second communication sections includes a plurality of fine holes,
a vortex chamber is disposed at a portion of the main body flow passage which is connected to at least one of the first and second communication sections, is configured to form a swirling flow of the liquid according to a flow velocity of the liquid from the other of the first and second communication sections, and to cause the liquid of the swirling flow to flow out through the plurality of fine holes, a barrier wall in which the plurality of fine holes are formed extends in a direction across a vortex axis along a central axis of the vortex chamber, and among the plurality of fine holes, fine holes located on an inner side in a swirl radial direction across the vortex axis in a top view of the barrier wall have a lower flow resistance than fine holes located on an outer side in the swirl radial direction.

2. The vibration damping device according to claim 1, wherein, among the plurality of fine holes, the fine holes located on the inner side in the swirl radial direction have a larger inner diameter than the fine holes located on the outer side in the swirl radial direction.

3. The vibration damping device according to claim 2, wherein, among the plurality of fine holes, the fine holes located on the inner side in the swirl radial direction have a shorter flow passage length than the fine holes located on the outer side in the swirl radial direction.

4. The vibration damping device according to claim 3, wherein flow resistances of the plurality of fine holes gradually decrease from the fine holes located on the outer side to the fine holes located on the inner side in the swirl radial direction.

5. The vibration damping device according to claim 2, wherein flow resistances of the plurality of fine holes gradually decrease from the fine holes located on the outer side to the fine holes located on the inner side in the swirl radial direction.

6. The vibration damping device according to claim 1, wherein, among the plurality of fine holes, the fine holes located on the inner side in the swirl radial direction have a shorter flow passage length than the fine holes located on the outer side in the swirl radial direction.

7. The vibration damping device according to claim 6, wherein flow resistances of the plurality of fine holes gradually decrease from the fine holes located on the outer side to the fine holes located on the inner side in the swirl radial direction.

8. The vibration damping device according to claim 1, wherein flow resistances of the plurality of fine holes gradually decrease from the fine holes located on the outer side to the fine holes located on the inner side in the swirl radial direction.

* * * * *